United States Patent [19]

Gabos et al.

[11] Patent Number: 5,367,816
[45] Date of Patent: Nov. 29, 1994

[54] FISHING TACKLE LURE

[76] Inventors: John J. Gabos, R.R. #1, Box 57G, Weatherly, Pa. 18255; Michael V. Olenek, 442 E. Carleton Ave., Hazleton, Pa. 18201

[21] Appl. No.: 129,469
[22] Filed: Sep. 30, 1993
[51] Int. Cl.5 .............................. A01K 85/14
[52] U.S. Cl. ........................... 43/42.5; D22/129
[58] Field of Search ............ 43/42.5, 42.51, 42.2, 43/42.22, 42.46; D22/129, 130, 131

[56] References Cited

U.S. PATENT DOCUMENTS

| | | |
|---|---|---|
| D. 240,922 | 8/1976 | Maxwell . |
| 1,471,280 | 10/1923 | Reekers . |
| 1,598,958 | 9/1926 | Crosby . |
| 1,831,267 | 11/1931 | Schwartz . |
| 1,866,465 | 1/1932 | Harrington et al. ............... 43/42.5 |
| 1,903,256 | 3/1933 | Catarau . |
| 2,058,121 | 10/1936 | Allen . |
| 2,315,307 | 3/1943 | Wilson . |
| 2,608,788 | 9/1952 | Niemi ............................... 43/42.5 |
| 2,945,317 | 7/1960 | Wittmann, Jr. .................. 43/42.5 |
| 3,656,253 | 4/1972 | Gaunt ............................... 43/42.33 |
| 4,142,318 | 3/1979 | Morrell ............................. 43/42.5 |
| 4,471,557 | 9/1984 | Gage ................................. 43/42.5 |
| 4,475,302 | 10/1984 | Jakeway ........................... 43/42.5 |
| 4,479,323 | 10/1984 | Burr ................................. 43/42.5 |
| 4,574,514 | 3/1986 | Kingston .......................... 43/42.5 |

FOREIGN PATENT DOCUMENTS 191176  8/1937  Switzerland ................. 43/42.51

*Primary Examiner*—P. Austin Bradley
*Assistant Examiner*—Jeanne M. Elpel
*Attorney, Agent, or Firm*—Dann, Dorfman, Herrell and Skillman

[57] ABSTRACT

A spoon lure for fishing in fresh water or sea water, comprised of a wedge-shaped strip of highly reflective metal or any other suitable material that is bent to a radius along its length and width, with a rudder at the wide end of the wedge set at an angle to the length of the body and rolled in the opposite direction of the radius. At the narrow end of the wedge, or the leading edge, there is a hole for fastening a swivel device which in turn is fastened to a fishing line. At the wide end, or trailing edge, there are two holes for fastening a hook. One hole is on center of the wide end at the base of the rolled wing and one hole is on the corner opposite the rolled rudder. This configuration results in a lure that will spin through the water with a tight pattern when the hook is placed in the center hole. When the hook is moved to the corner hole, the action changes to a slower spin with a random dodging or darting motion, resulting in a much wider pattern. In addition to two different actions when the lure is being drawn through the water, a third aggressive action is evident when the lure is used in a jigging or flipping presentation.

7 Claims, 2 Drawing Sheets

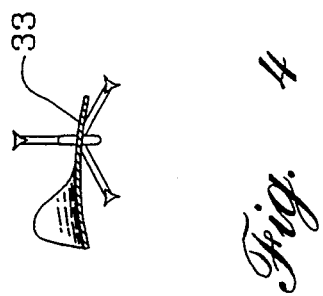
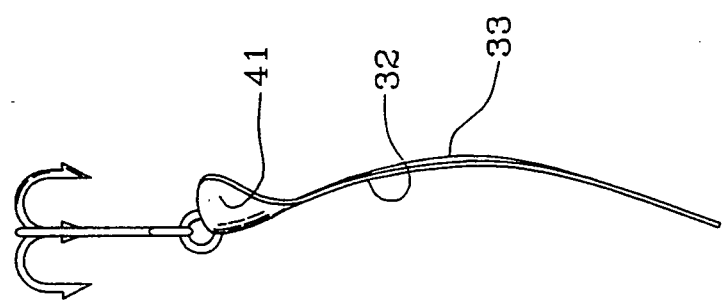
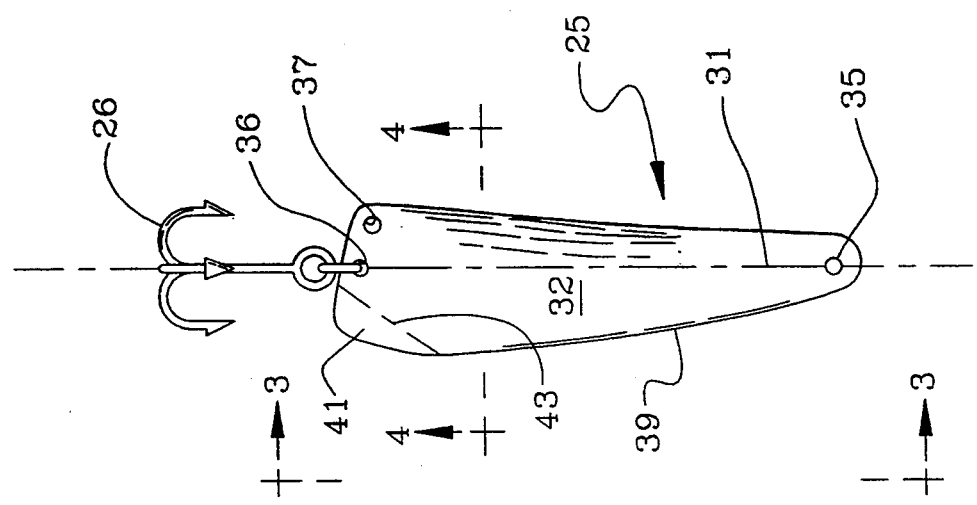

FISHING TACKLE LURE

FIELD OF THE INVENTION

The present invention relates to fishing tackle and more particularly to fishing tackle which includes an improved lure of the spoon type.

BACKGROUND OF THE INVENTION

The invention concerns an artificial fishing lure that can be used in both fresh and salt water. The lure is a wedge-shaped spoon that has a hole in the narrow end for fastening a swivel device which, in turn, will be fastened to a fishing line. The opposite end, or the wide end of the lure, has two holes for fastening a hook with a wire. One hole is on center and one hole is on the corner opposite the rolled wing. The spoon is bent into a radius along its length and width resulting in a spoon shape. The wide end is rolled at an angle to the length and is the opposite direction of the radius. As the spoon is drawn through the water, it will either spin in a tight pattern or spin slowly in a wide pattern with a random dodge or dart, depending on the position of the hook at the rear of the lure. When the lure is dropped or flipped into the water and allowed to fall through the water at its own speed, it displays a very wide, slow, random action as it descends.

After studying a collection of prior spoon-type lures, it is obvious the intensity of the action changes with a change in speed—basically the same motion at different intensities. The present invention provides three different motions, i.e. two by changing the hook position and one by changing the presentation. A wide variety of lures can be manufactured by combining these actions with a variety of finishes and colors.

OBJECTS AND SUMMARY OF THE INVENTION

One object of this invention is to provide a variety of actions from a single lure.

Another object of this invention is to produce a novel lure that allows simple and economical manufacture.

Specifically, the invention provides a lure of a novel configuration which may be manufactured from any highly reflective metal or any acceptable material. The size of the lure, the ratio of the radii, and the orientation of the rudder may be modified to optimize the lure. The lure provides a simple base to apply a variety of colors and finishes.

BRIEF DESCRIPTION OF THE DRAWINGS

All of the objects of the invention are more fully set forth hereinafter with reference to the accompanying drawings, wherein:

FIG. 2 is an enlarged plan view of the lure shown in FIG. 1;

FIG. 3 is a lefthand elevational view as seen from the line 3—3 of FIG. 2; and

FIG. 4 is a transverse sectional view taken on the line 4—4 of FIG. 2.

DESCRIPTION OF THE PREFERRED EMBODIMENT

Figure 1:
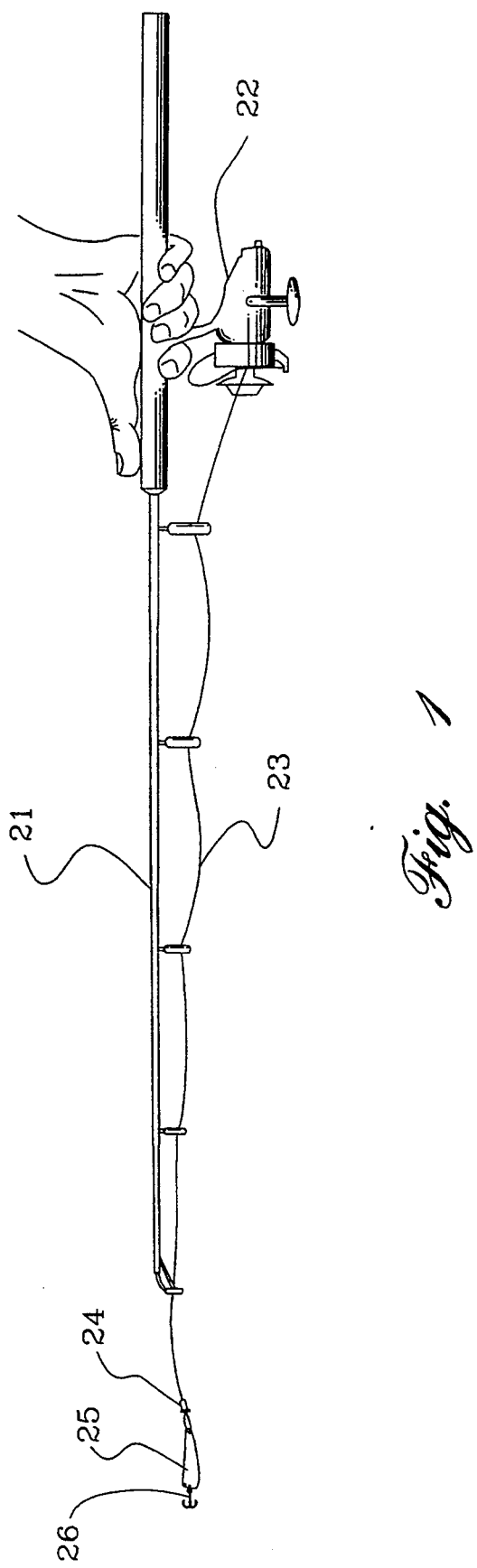
FIG. 1 is an elevational view of fishing tackle embodying the present invention.

Referring to the drawings, FIG. 1 illustrates fishing tackle embodying an improved lure in accordance with the present invention. As shown, the tackle comprises a rod 21 having a reel 22 and a fishing line 23. The line is threaded through the line guides of the rod and terminates in a swivel 24 to which a novel lure 25 is secured. The lure has a generally wedge-shaped outline and is connected to the swivel at the narrow end and a hook 26 is connected to the lure at the wide end. As shown in FIGS. 2–4, the wedge-shaped lure has a longitudinal axis 31 which has a longitudinal curvature providing a concavity 32 extending from end to end. Transversely, the lure has a shallow arcuate form as shown at 33 in FIG. 4 which cooperates with the concavity 32 to define a hollow bowl-like surface on one side of the lure. The lure is made of a material with substantially uniform thickness throughout so that the opposite side of the lure provides a convex bowl-like surface. Preferably, the curvature along the longitudinal axis is smaller than along the transverse axis, i.e. the radius of curvature is larger along the transverse axis than the radius of curvature along the longitudinal axis. The ratio of the two radii of curvature will fall between 1:1 and 2:1.

At the narrow end of the wedge-shaped outline, the lure is provided with an eyelet 35 for attachment to the swivel 24. At the wide end of the wedge-shaped outline, the lure has an eyelet 36 approximately on the longitudinal axis 31 and a second eyelet 37 offset from the longitudinal axis 31 so that the eyelet 37 is positioned adjacent a longitudinal edge 38 of the lure. At the opposite longitudinal edge of the lure, a tab 41 is bent outwardly in a direction away from the concave surface of the lure 25 along an angular bending line 43 which is disposed at an acute angle to the longitudinal axis 31 and offset from the axis opposite to the offset of the eyelet 37 from the longitudinal axis. In the present instance, the bending line has a radius of curvature which is smaller than the radius of curvature in the body of the lure along the longitudinal and transverse axes. In the present instance, the tab is rolled out from the body of the lure with a smooth curvature at its hook end.

The material of the lure is preferably reflective sheet material of uniform thickness. The lure may be stamped from stainless steel or copper, or be molded from plastic. The finish may be shiny, smooth, mottled or painted and/or any combination of the above.

In operation, the lure is secured to the fishing line through a swivel as shown in FIG. 1. When the lure is dropped or flipped into the water and allowed to fall through the water at its own speed, it displays a very wide slow random action as it descends. If the hook is placed in the center hole 36 as shown, when the lure is drawn through the water, it will spin with a tight pattern. When the hook is moved to the other hole 37, the action of the lure as it is drawn through the water changes to a slower spin with a random dodging or darting motion, resulting in a much wider pattern. The changing of the hook hole may be done without removing the lure from the fishing line. In addition to the two different actions when the lure is being drawn through the water, a third aggressive action is evident when the lure is used in a jigging or flipping presentation. Thus, the design of the lure affords a wide variety of actions caused by the manner in which it is used. The skilled fisherman can operate the lure to simulate the action of a bait fish, as desired. The lure may be used for cast-and-retrieve, trolling, jigging, or flipping, and for all types of sport or commercial fishing.

The presentation of the lure may be varied according to the desires of the fisherman and the geometry of the lure may be modified to achieve varied effects. Preferably, the material of the lure is sufficiently rigid to avoid inadvertent flexing or deformation. If made of stainless steel or copper, it may be modified by the fisherman by bending or shaping the metal to achieve differing effects. With the use of the two holes at the hook end of the lure, a different action is achieved, depending upon the selection of which hole. The curved configuration of the body of the lure and the curvature of the merger of the tab 41 with the lure provides a streamlined surface which is believed to contribute to the novel action achieved by the lure as it is drawn through the water.

While a particular embodiment of the invention has been herein illustrated and described, it is not intended to limit the invention to such disclosures, but changes and modifications may be made therein and thereto within the scope of the following claims.

We claim:

1. A fishing lure comprising a body of generally wedge-shaped outline having a wide end and a narrow end with a longitudinal axis extending therebetween, the width of said wedge-shaped body tapering gradually from the wide end to the narrow end, said body having a transverse cross section of arcuate form providing a convex surface on one side and a concave surface on the opposite side, said convex surface defining a longitudinally-extending bowl-shaped convex surface on said one side and said concave surface defining a longitudinally-extending bowl-shaped hollow surface on said opposite side, at the opposite ends of the longitudinal axis said lure having eyelets for attachment of said lure to a fishing line at the narrow end and for attachment of said lure to a fishing hook at the wide end, whereby when said fishing hook is drawn through the water by the fishing line, the lure causes the hook to follow a path simulating the travel of a bait fish, the improvement wherein said lure has a rudder component at the wide end thereof, said component comprising a tab bent out from said bowl-shaped convex surface along a bending line at the wide end, said bending line being disposed at an acute angle to the longitudinal axis of the lure and offset laterally therefrom, and said wide end has a second eyelet for alternative attachment to a fishing hook, said wide-end eyelets being spaced laterally from said bent-out tab, and being aligned with said tab transversely of said longitudinal axis.

2. A fishing lure according to claim 1, wherein one of said eyelets at the wide end is along the longitudinal axis of the lure, and the other of said eyelets at the wide end is offset from said longitudinal axis away from said tab bending line.

3. A fishing lure according to claim 1 wherein said longitudinal axis has a radius of curvature providing said bowl-shaped surfaces, and the arcuate transverse cross section has a radius of curvature no smaller than said radius of curvature of the longitudinal axis.

4. A fishing lure according to claim 3 wherein said transverse radius of curvature is between one and two times the longitudinal radius of curvature.

5. A fishing lure according to claim 1 wherein said bending line of the tab provides a streamlined surface.

6. Fishing tackle comprising a rod, a reel, fishing line and a fish hook, the improvement comprising a lure adapted to be mounted intermediate the fish hook and the fish line, said lure comprising a body of generally wedge-shaped outline having a wide end and a narrow end, the width of said wedge-shaped body tapering gradually from the wide end to the narrow end, with a bowl-shaped convex surface on one side and a bowl-shaped hollow surface on the opposite side, means attaching the narrow end to the fishing line at the center of the narrow end, and primary means attaching the wide end to the fishing hook at the center of the wide end, said lure having a central longitudinal axis extending between said respective attaching means, said lure further comprising an alternative auxiliary means for attaching said hook at the wide end of said wedge-shaped outline, said alternative attaching means being offset laterally from said longitudinal axis, said primary and alternative attaching means being aligned transversely of said central longitudinal axis, said lure also having a rudder at the wide end of the lure in alignment with said primary and alternative attaching means, said rudder being bent out from the convex surface away from the concave surface along a bending line at an acute angle to said longitudinal axis at a position offset from the longitudinal axis opposite said auxiliary attaching means, whereby the travel of the lure through the water is affected by changing the connection of the hook between said primary and alternative attaching means without removing the attachment means at the opposite end of the lure from the line.

7. Fishing tackle according to claim 6 wherein said attaching means at the narrow end of the lure comprises a swivel connection in the fishing line between said rod and said lure.

* * * * *